Patented May 30, 1939

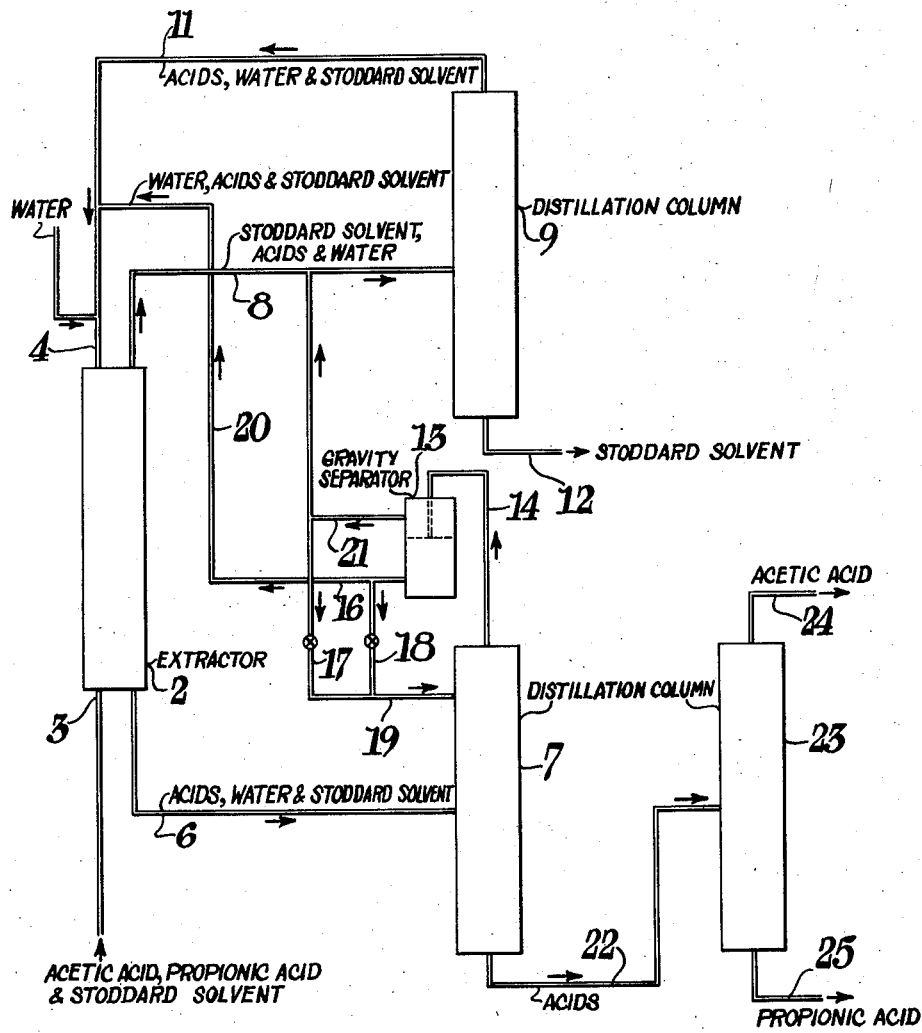

2,159,984

UNITED STATES PATENT OFFICE 2,159,984

RECOVERY OF ACIDS FROM SLUDGE

Webster E. Fisher, Rochester, N. Y., assignor, by mesne assignments, to Eastman Kodak Company, Jersey City, N. J., a corporation of New Jersey Application February 6, 1936, Serial No. 62,716

12 Claims. (Cl. 202—42)

This invention relates to processes for separating and recovering aliphatic acids and their anhydrides and, more particularly, to a process for separating and recovering acetic and propionic acid and their anhydrides from admixtures with hydrocarbon materials.

The separation, recovering and utilization of aliphatic acids and anhydrides resulting in various commercial processes is a problem of technical importance. In certain processes there is obtained, in the nature of a by-product, an acid sludge containing one or more hydrocarbon materials and one or more of the lower fatty acids. There may be fatty anhydrides present also. The hydrocarbon component often includes various high boiling hydrocarbons, such as nonanes, decanes, undecanes, dodecanes and tridecanes. For example, in the manufacture of cellulose esters by fibrous esterification, there is obtained a sludge acid comprising a mixture of halogenated materials, acetic acid, propionic acid, Stoddard solvent, and, in some instances, acetic and propionic anhydrides. In order that the process of esterification be practical and efficient, it is, of course, highly desirable that the acid component be recovered in a condition whereby it may be reutilized.

The recovery of the acid and anhydride components present in these residue and by-product materials presents somewhat of a problem. The halogenated component, such as for example trichloroethylene, can usually be separated from the other components by fractionation. However, mixtures of aliphatic acids, such as acetic and propionic acid, with various hydrocarbon materials such as comprise Stoddard solvent cannot be separated by fractionation because of the constant boiling mixtures formed.

For simplicity Stoddard solvent has been referred to as one component, although it actually contains many components. Similarly, instead of speaking of the azeotropes formed between acetic and propionic acids and Stoddard solvent specifically, I should speak of the azeotropes formed between the acids and the individual components of the hydrocarbon material Stoddard solvent. However, for all practical purposes and for the purposes of this application, it seems sufficient and satisfactory that I refer to Stoddard solvent as a single component, it being kept in mind, however, that this solvent is comprised of a number of hydrocarbon materials and the azeotropes formed may vary somewhat depending on the particular cut of Stoddard solvent used and the efficiency of fractionation.

The various azeotropes formed by the aforementioned components have been investigated by me, both at atmospheric pressure and at a reduced pressure. The following azeotropes were obtained by carefully fractionating mixtures and analyzing the distillates. Compositions are expressed as per cent by weight.

|  | 760 mm. | 50 mm. |
|---|---|---|
|  | Percent | Percent |
| Acetic acid | 71–77 | 76 –84 |
| Propionic acid | 10–11.4 | 6 –8 |
| Stoddard solvent | 13–16 | 8.5–17.5 |
| Acetic acid | 76–80 | 80 –82 |
| Stoddard solvent | 20–24 | 18 –20 |
| Propionic acid | 50–65 | 45 –65 |
| Stoddard solvent | 35–50 | 35 –55 |

It is, therefore, apparent that it would be unsatisfactory to attempt to separate mixtures of aliphatic acid and the anhydrides, as obtained in various commercial processes, by only usual distillation procedure. I have developed a novel process involving extraction and distillation which has proven to be superior in many respects to any processes heretofore known for separating various mixtures of aliphatic acids and anhydrides with hydrocarbon materials which are immiscible with water and form constant boiling mixtures with acetic acid and/or the homologues.

This invention has as an object to provide a process for separating and recovering aliphatic acids and anhydrides in admixture with chemical compounds which are immiscible with water and form constant boiling mixtures with aliphatic acids. A further object is to provide a process which is particularly applicable to separating the sludge mixtures of acetic and propionic acid obtained in the production of cellulose esters by fibrous esterification. A still further object is to provide a process for the separation and recovery of aliphatic acid mixtures mixed with various proportions of aliphatic anhydrides. A further object is to provide a process of acid and anhydride recovery which employs extraction and distillation. It is also an object to provide a process which will be simple and inexpensive. Other objects will appear hereinafter.

These objects are accomplished by the following invention. The hydrocarbon component in the admixture, with which the present invention is concerned and in the preferred embodiment comprises Stoddard solvent, may, for all practical purposes, be considered completely immiscible with water. This hydrocarbon component and acetic acid are miscible providing there is no water present. I have found that by the addition of sufficient water in a proper manner to the admixtures of aliphatic acids and anhydrides with hydrocarbons, with which the present invention is concerned, the admixture may be caused to separate into two layers. The upper layer will comprise chiefly the hydrocarbon component together with small amounts of acids and water and the lower layer will comprise principally of acid with small amounts of hydrocarbon and water.

Of course, if any anhydrides are present and are not previously removed in accordance with my novel procedure to be described in detail hereinafter, they will react with water to form acids. Hence, if the anhydride is not removed, sufficient water must be added over that in excess of the amount necessary to react with the anhydrides.

My process may be carried out in any apparatus of a known type, although it is to be noted in commercial operations I prefer to employ a system which includes a countercurrent extractor and an apparatus set-up of the type shown in the accompanying drawing.

In the accompanying drawing which forms a part of the present application, Fig. 1 is a diagrammatic side elevation showing one suitable arrangement for carrying out my invention.

In Fig. 1, 2 represents an extractor or other suitable contacting device. This unit is fed with the mixture to be treated at 3, the water or watery component addition is made at 4. The lower layer from unit 2 is conducted through conduit 6 to distillation column 7. The upper layer from extractor 2 is conducted through conduit 8 to distillation column 9. The head of distillation column 9 is connected to the inlet 4 of extractor 2 by means of conduit 11. The lower section of column 9 is equipped with outlet conduit 12.

The head of distillation column 7 is connected to separator 13 by means of conduit 14. Separator 13 is also connected to the head of column 7 by means of valve conduits 16, 17, 18 and 19. The separator is communicatively connected to conduit 11 by means of conduit 20. Conduit 17 extended and conduit 21 are provided to connect the separator 13 to feed conduit 8.

The lower sections of column 7 are connected by conduit 22 with another distillation column 23. This column is provided with the offtake 24 for the heads and offtake 25 for the tails.

Inasmuch as the columns, extractor, separator, etc., are of standard and well-known construction individually, specific description of these particular parts of the combination appears unnecessary. It is understood that this drawing is merely diagrammatic and that my set-up embraces the use of condensers, dephlegmators, reflux lines, vaporizers, storage tanks in the various lines, and other devices employed in distillation and similar processes.

In order to separate a mixture, in accordance with my invention, any non-solvent which may be present, such as trichloroethylene or propylene chloride may be fractionated off leaving a mixture comprising principally lower fatty acids and hydrocarbon materials such as Stoddard solvent. To this mixture is added a small amount of water or watery materials. Around 5-25% of the weight of the original mixture is generally sufficient when treating a mixture of acetic and propionic acids and Stoddard solvents, such as result from the fibrous esterification of cellulose, and on the average around 3-12% of water would be sufficient. This water addition induces the separation of the mixture into two layers. The upper layer comprises chiefly the hydrocarbon together with small amounts of acids and water. The lower layer comprises chiefly acids with small amounts of hydrocarbon and water. As already indicated, if any anhydrides were present and not removed prior to the water addition they will react with water to form acids. Hence, the water addition should be sufficient to take care of any anhydrides present and to cause the desired separation. The type of apparatus used when adding the water may be simply a tank or a countercurrent extractor.

The lower layer, as mentioned above, is mostly the fatty acids together with small amounts of water and the hydrocarbon component which, in the instance under consideration is Stoddard solvent. It is well known that water can be fractionated from acetic acid only with great difficulty. The hydrocarbon cannot be removed from a mixture of lower aliphatic acids because of the constant boiling mixtures formed. For example, the constant boiling mixture formed between Stoddard solvent and acetic acid boils only about 2° C. below that of acetic acid. Hence, separation by fractionation is substantially impossible.

I have found, however, that the residual hydrocarbon component which, in the particular instance under consideration, is Stoddard solvent, and water form an azeotrope boiling at about 98° C. This azeotrope contains about 2.1 parts of water to a part of Stoddard solvent by weight. I have found that I may use the water and hydrocarbon component as mutual azeotropic agents to remove each other. This operation may be readily carried out in a distillation column. For optimum operation the proper ratio of hydrocarbon and water should be maintained in the column. In order to have the right proportions of each in the column at the same time a part of either the water layer or the hydrocarbon layer of the distillate may be returned to the column.

In this distillation step a certain amount of the lower aliphatic acids may be removed with the water and hydrocarbon, but since this, in my preferred process, is returned to the extractor and thus remains in the system there is no loss of these constituents. After the water and hydrocarbons are removed there is left a mixture of fatty acids which may be separated by fractionation.

The upper layer comprised principally of hydrocarbons is freed from water and acids by fractionation. Because of the azeotropes formed a small amount of hydrocarbon will be removed during this step, but since it is returned to the system there is no loss. After the removal of these small amounts of acids and water substantially pure hydrocarbon solvent is left which may be employed as desired.

In practice the whole process would be carried out in a continuous manner. Instead of adding water to the original mixture to separate it into two layers, I would add the distillate from the columns where water is removed from the acid and hydrocarbon solvent layers. Hence, a certain amount of water could be introduced into the system originally and it would circulate around, only enough water being added to make up for that lost, either as a process loss or by reacting with anhydrides.

Further details concerning my process may be had by reference to the following example. The specific values set forth therein are merely for the purposes of illustration and are not to be considered as limiting my invention. Reference is made to Fig. 1 in considering this example.

A continuous, countercurrent extractor 2 is continuously fed at 3 with an acid mixture containing 28.6% acetic acid, 28.6% Stoddard solvent which, as pointed out, is a mixture of hydrocarbons, and 45.8% propionic acid. There is also continuously fed to the extractor at 4 a mixture of water, Stoddard solvent, acetic acid and propionic acid, this mixture being returned to the extractor from stills at other points in the system. The amount of water in this latter mixture may amount to about 5–15% of the weight of the acid being treated. Because of the water, the liquid in the extractor 2 separates into two layers; one layer containing Stoddard solvent with a little water and acetic and propionic acids, the other layer containing mostly acetic and propionic acids with most of the water and some Stoddard solvent.

As the upper, or Stoddard solvent, layer emerges from the extractor, it is continuously fed through conduit 8 to a middle plate of a distillation column, where water, acetic acid, and propionic acid are continuously removed and returned to extractor 2. Because of the azeotropes formed between Stoddard solvent and water, and between Stoddard solvent, acetic acid, and propionic acid, some Stoddard solvent is also removed, this, too, being returned to extractor 2 along with the rest of the distillate. Stoddard solvent containing no acid or water is discharged from the still pot of column 9, either as liquid or through another short column (not shown).

The lower, or acid, layer continuously emerging from the extractor, is fed through conduit 6 to another distillation column where, because of the azeotrope formed between Stoddard solvent and water, these two components are continuously removed. It will be desirable to conduct this distillate to continuous gravity separator 13, returning part of one layer to the column for regulation as already referred to. The Stoddard solvent layer from the separator may be fed through conduit 21 to the Stoddard solvent still 9 while the water layer may be returned through conduit 20 to the extractor. As the acetic and propionic acids are freed from water and Stoddard solvent, they are removed continuously from the bottom of the column 7 and fed through conduit 22 to another column 23 where they may be separated by fractionation according to usual procedure.

As indicated above, this acid sludge mixture of the lower aliphatic acids and hydrocarbon solvent, such as Stoddard solvent, may contain appreciable amounts of the lower fatty acid anhydrides. The addition of water to the mixture would convert these anhydrides to the corresponding acids. It is apparent, if there is an appreciable anhydride content, that the value of this ingredient of the mixture would be decreased if converted to the acid by a water addition, inasmuch as it would require pyrolysis or other treatment to reconvert the acid to the anhydride.

I have now found that the anhydrides can be recovered as such from this sludge if the following procedure is followed: The sludge is first subjected to a fractional distillation whereby it is divided into two parts, the first fraction consisting of the fatty acids and a part of the high boiling aliphatic hydrocarbons, while the second consists of a mixture of the anhydrides and the remainder of the high boiling aliphatic hydrocarbons. The fatty acids can then be separated from the first fraction according to the method disclosed in the above example, while the ingredients in the second fraction, if they consist only of acetic anhydride and a high boiling aliphatic hydrocarbon, will separate in two layers and can be separated by simple decantation. If, however, this second fraction contains an appreciable amount of higher homologues of acetic anhydride, these can be removed from the high boiling aliphatic hydrocarbon by extraction with acetic anhydride. This extraction is preferably carried out in a countercurrent manner.

The application of this procedure for separating the anhydride component may be better understood by reference to the following example, where I have set forth one of the preferred embodiments of my invention. This example is included merely for the purposes of illustration and is not in any sense a limitation of my invention. The mixture to be separated comprised the following components:

| | Grams |
|---|---|
| Acetic acid | 552 |
| Propionic acid | 179 |
| Acetic anhydride | 226 |
| Propionic anhydride | 276 |
| Stoddard solvent | 420 |

After fractionation of the mixture, the following concentrations and weights as distillate and residue were obtained:

| | | |
|---|---|---|
| Distillate | grams | 827 |
| Propionic acid | per cent | 9.1 |
| Acetic acid | do | 76.8 |
| Stoddard solvent | do | 14.1 |

It will be noted that the ratio of acetic acid in the distillate to the propionic acid content is different than the ratios in the mixture being treated. Similar remarks apply to the anhydride contents. This is explainable by the following reaction:

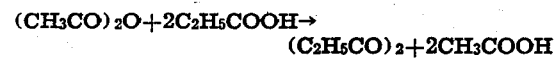

The preliminary fractionation causes changes in the ratios as indicated.

| | | |
|---|---|---|
| Residue | grams | 825 |
| Acetic anhydride | per cent | 18.8 |
| Propionic anhydride | do | 44.5 |
| Stoddard solvent | do | 36.8 |

The distillate from this operation may be treated by the method fully described above, while the residue can be distilled, made up to the desired strength and reused in a fibrous esterification, if desired. That is, by adding sufficient water or watery materials to this distillate mixture of acetic and propionic acid with Stoddard solvent as in extractor 2 the mixture is caused to separate into two layers, acid and solvent. The acid layer can be distilled in column 7 and the solvent layer in column 9 as already described to recover the respective constituents.

I have described my invention in particular with reference to separation of aliphatic acids from admixture with Stoddard solvent because my process is particularly adapted thereto. My process is also particularly adapted to the separation of mixtures of aliphatic acid and hydrocarbons obtained in processes for the manufacture of cellulose esters by fibrous esterification.

It is particularly adapted to the separation of acetic and other lower aliphatic acids from their admixture with hydrocarbons boiling within the range of about 130°–210° C. It is, therefore, apparent that my invention may be applied to various mixtures of aliphatic acids and anhydrides with a variety of hydrocarbon materials. Generically, I designate the hydrocarbon material as a hydrocarbon substantially immiscible with water and capable of forming a constant boiling mixture with acetic acid and/or propionic acid, since it is with this type of hydrocarbon that difficulties of separation of aliphatic acids are usually encountered.

Stoddard solvent which I have for simplicity of description referred to as if a single component comprises a mixture of hydrocarbons. This liquid is referred to and described to some extent in United States Patent No. 2,005,381. It will be noted that my process also amounts to an effective method whereby Stoddard solvent or other hydrocarbon may be recovered in a reuseable or substantially pure condition. Since such hydrocarbons are of value, this feature of my invention is of importance.

It is apparent from the preceding description that I have provided a simple and effective process for the recovery of aliphatic acids, anhydrides, and hydrocarbon solvents from by-products and waste materials which might otherwise carry these valuable components to waste.

What I claim as my invention and desire to secure by Letters Patent of the United States is:

1. A process for the separation and recovery of the lower aliphatic acids existing in the form of a mixture with hydrocarbon materials having a boiling point between about 130° C. and 210° C. and substantially immiscible with water, which comprises adding sufficient water to the mixture to cause separation of the mixture into an acid layer containing a material amount of the acid and some quantities of water and hydrocarbon, and a second layer containing a material amount of the hydrocarbon, subjecting the acid layer to a distillation treatment whereby the hydrocarbon and water content are removed as an azeotrope, condensing and separating this azeotrope distillate and returning a portion thereof to the distillation treatment for regulation.

2. A process for the separation and recovery of acetic and propionic acids existing in the form of a mixture with hydrocarbon materials substantially immiscible with water and capable of forming a constant boiling mixture with acetic acid, which comprises adding sufficient water to the mixture to cause separation of the mixture into an acid layer containing the greater part of the acids and smaller amounts of hydrocarbon and water, and another layer containing the greater part of the hydrocarbon, subjecting the acid layer to a distillation treatment whereby the water and hydrocarbon are removed as an azeotrope, condensing and separating the azeotrope, and returning a portion of one of the separated materials to the distillation step for regulation.

3. A process of separating and recovering acetic and propionic acids existing in the form of a mixture with hydrocarbon materials substantially immiscible with water and capable of forming a constant boiling mixture with acetic acid, which comprises adding sufficient water to the mixture to cause separation thereof into an acid layer containing the principal part of the acids and some amounts of hydrocarbon and water, and a second layer containing the principal part of a hydrocarbon, subjecting the acid layer to a distillation treatment whereby a mixture of acetic and propionic acids is obtained, and then subjecting this mixture to a further treatment to recover each the acetic acid and propionic acid therefrom.

4. The continuous process for separating and recovering lower aliphatic acids existing in the form of a mixture with hydrocarbon materials substantially immiscible with water, which comprises adding sufficient water to the mixture to cause separation of the mixture into an acid layer containing the principal part of the acids and smaller amounts of hydrocarbon and water, and another layer containing the principal part of the hydrocarbon and smaller amounts of acid and water, subjecting the acid layer to a distillation treatment whereby the hydrocarbon and water are separated from the acids, subjecting the hydrocarbon layer to a distillation treatment whereby the acids and water are separated from the hydrocarbon, and returning these separated constituents to the water addition step.

5. In a continuous process for the separation and recovery of acetic and propionic acids existing in the form of a mixture with hydrocarbon materials the steps which comprise extracting the mixture with a water containing aliphatic acid and hydrocarbon solution to obtain a layer containing the principal portion of the acids together with smaller amounts of hydrocarbon and water, and another layer containing the principal part of the hydrocarbon and smaller amounts of water and acid, subjecting the acid layer to a distillation treatment whereby a distillate of hydrocarbon and water is obtained, subjecting the hydrocarbon layer to a distillation treatment whereby a distillate containing acid and water is obtained, and returning at least a portion of these distillate materials to the extraction step.

6. A process for the separation and recovery of about 20%–35% acetic and about 30%–50% propionic acids existing in the form of a mixture with about 20%–40% hydrocarbon materials substantially immiscible with water and capable of forming a constant boiling mixture with the acetic acid, which comprises adding an amount of water between about 5%–30% of the weight of the acid being treated to the mixture sufficient to cause separation of the mixture into a layer containing a large part of the acids and another layer containing a large part of the hydrocarbon materials, and then recovering acetic and propionic acids from the acid layer.

7. A process for the separation of mixtures containing aliphatic acids and Stoddard solvents, which comprises adding sufficient water to the acid-Stoddard solvent mixture, whereby the mixture is caused to separate into a layer containing the principal part of the aliphatic acid and a second layer containing the principal part of the Stoddard solvent, recovering the Stoddard solvent from the second layer by distillation, and returning the head products of the distillation step to the water addition step.

8. A process for separating a mixture of two different aliphatic acids mixed with a hydrocarbon having a boiling point between 130°–210° C., substantially immiscible with water, having different distribution ratios between the solvent, water, and the mixture, the water also being capable of causing the formation of two liquid phases when contacted with the mixture, which comprises forming a feed mixture containing predetermined amounts of said aliphatic acids, water and an amount of hydrocarbon less than the quantity present in the first-mentioned mixture, distilling said feed to produce a residue essentially comprising the acids, and the hydrocarbon-water as a distillate, continuously withdrawing the distillate, separating the withdrawn materials into a hydrocarbon layer and a water layer, withdrawing amounts from both layers in proportion to the amount in the feed, whereby the acids are obtained as the residue, and continuously returning the residual portion of said layers to the distilling step.

9. In a process for separating the aliphatic acid component from a mixture of said acid component with a hydrocarbon component, the steps of distilling the mixture together with water, the water being a selective solvent for the acid and also capable of causing the formation of the two liquid phases, a hydrocarbon phase and an aqueous acid phase, withdrawing a distillate of hydrocarbon-water from the distillation step, separating the distillate in the liquid phase into a liquid-hydrocarbon layer and a watery layer, withdrawing all of one of said layers together with a portion of the other layer, wherein the proportions of each, the hydrocarbon and water, with respect to the feed to the distillation step is such that only the acids are the residue of the distillation, substantially continuously returning to the distillation the layer remaining, and substantially continuously withdrawing from the distillation the residue essentially comprising said acid component.

10. In a process for separating an aliphatic acid component from a mixture thereof with hydrocarbon which is immiscible with water, the steps of distilling the mixture with water which acts as a selective solvent for said acid component and is adapted to cause the formation of two liquid phases when contacted with the mixture, continuously withdrawing vapors from the distillation, liquifying and separating the liquid into two layers, one of said layers essentially comprising the solvent, water, and the other layer essentially comprising the hydrocarbon, withdrawing from both of the layers a composition wherein the ratio of the water to hydrocarbon is substantially similar to the ratio thereof in the feed, whereby a residue of the distillation essentially comprising the acid component is obtained, substantially continuously returning to the distillation the remainder of said layers and withdrawing said acid component from the distillation.

11. A process of separating and recovering the lower aliphatic acids from a mixture containing various amounts of hydrocarbons substantially immiscible with water and halogenated compounds, which comprises subjecting the mixture to a fractionating treatment to remove the halogenated compounds, adding sufficient water to the mixture remaining to cause separation thereof into a layer containing the principal part of the aliphatic acids, together with some water and hydrocarbon, and another layer containing the principal part of the hydrocarbons, subjecting the acid layer to a distillation treatment whereby the hydrocarbon and water content are removed as an azeotrope, condensing and separating this azeotrope distillate and returning a portion thereof to the distillation treatment for regulation.

12. A process for the separation of mixtures containing aliphatic acids and hydrocarbons immiscible with water, which comprises adding sufficient water to the acid-hydrocarbon mixture to cause the separation of the mixture into a layer containing the principal part of the acid, and another layer containing the principal part of the hydrocarbon, recovering the hydrocarbon from the second layer by distillation thereof and returning the head products of the distillation step to the aforementioned water addition step.

WEBSTER E. FISHER.